United States Patent [19]
Joss et al.

[11] Patent Number: 5,097,915
[45] Date of Patent: Mar. 24, 1992

[54] POSTAL RATE DEVICE

[75] Inventors: Michael Joss, Chicago; Stanley Gresens, Homewood, both of Ill.

[73] Assignee: Health O Meter, Inc., Bridgeview, Ill.

[21] Appl. No.: 604,573

[22] Filed: Oct. 26, 1990

[51] Int. Cl.⁵ .................... G01G 23/22; G01G 19/40
[52] U.S. Cl. .................... 177/34; 177/25.15; 177/128
[58] Field of Search ............ 177/34, 25.15, 243, 177/128

[56] References Cited

U.S. PATENT DOCUMENTS

| | | | |
|---|---|---|---|
| 801,016 | 10/1905 | Johnson | 177/34 |
| 825,812 | 7/1906 | Emanuel | 177/34 |
| 1,715,832 | 6/1929 | Hapgood | 177/34 |
| 2,193,212 | 3/1940 | Vincent | 177/34 |
| 3,786,880 | 1/1974 | Artwick | 177/243 |
| 3,866,699 | 2/1975 | Soehnle et al. | 177/34 |
| 4,838,367 | 6/1989 | Tsai | 177/25.15 |

Primary Examiner—George H. Miller, Jr.
Attorney, Agent, or Firm—Dick and Harris

[57] ABSTRACT

A postal rate device for use in cooperation with a scale for facilitating interchangeability of an insert card bearing indicia representing a weight to rate conversion table. The device includes a cover which is configured with a recessed portion that accepts insertion of the insert card as well as a releasably securable shield. There are clips on the back side of the cover for removable attachment to the scale face plate. An aperture in the recessed portion of the cover facilitates effecting release of the shield by pushing a pencil or the like through the aperture even while the cover remains attached. Alternatively, once the cover is detached a pencil or the like may be pushed through an aperture to release the shield and insert card or the user may grasp the cover and push on the back side of the recessed portion to pop-out the shield and insert card. Accordingly, removal and replacement of the insert card from the scale, can be readily accomplished without the use of any special tools.

20 Claims, 2 Drawing Sheets

U.S. Patent        Mar. 24, 1992        Sheet 1 of 2        5,097,915
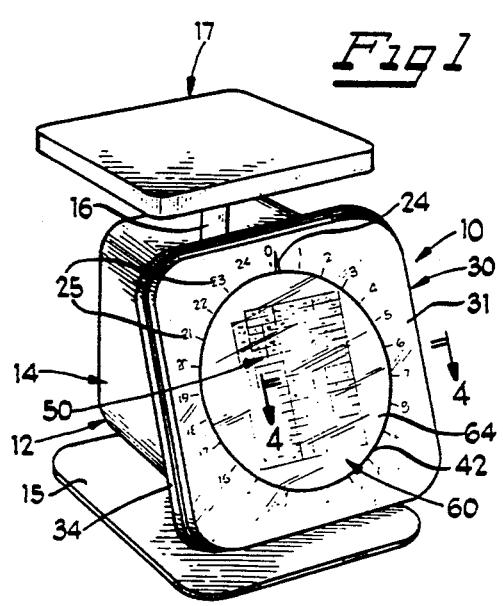
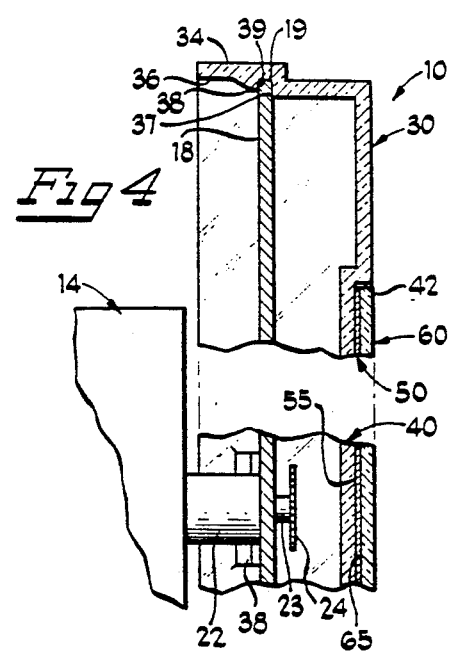
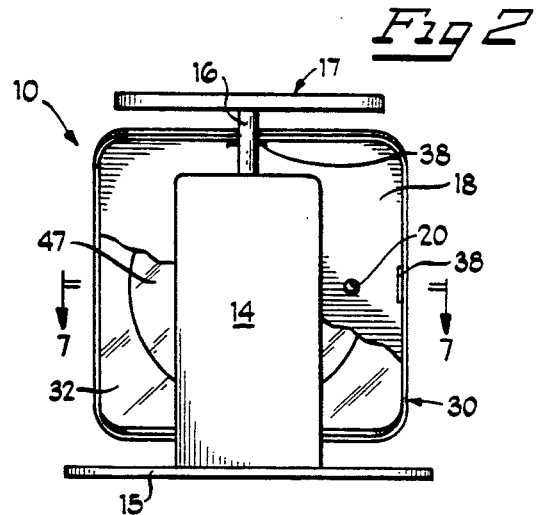
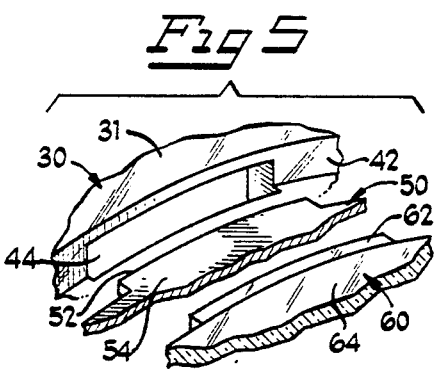
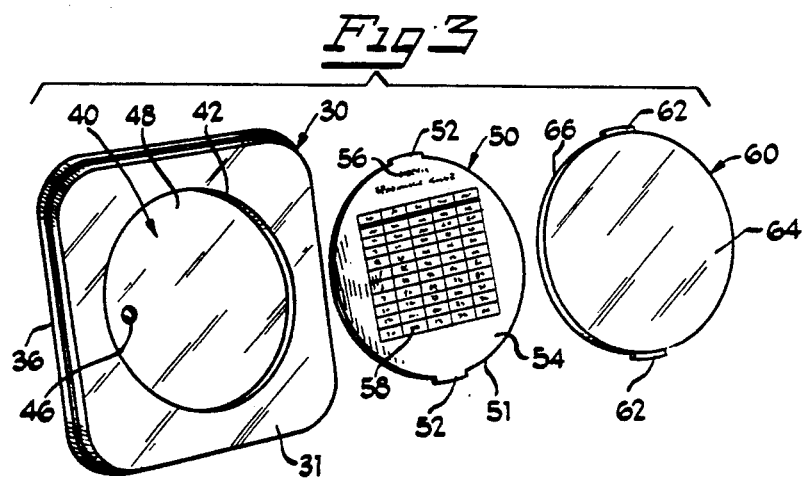
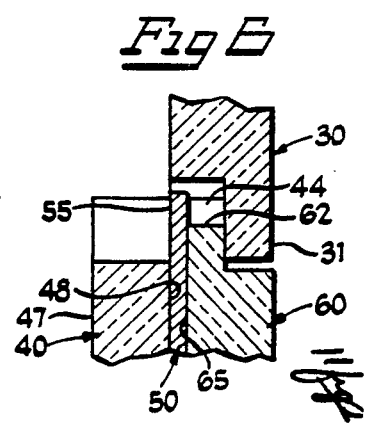

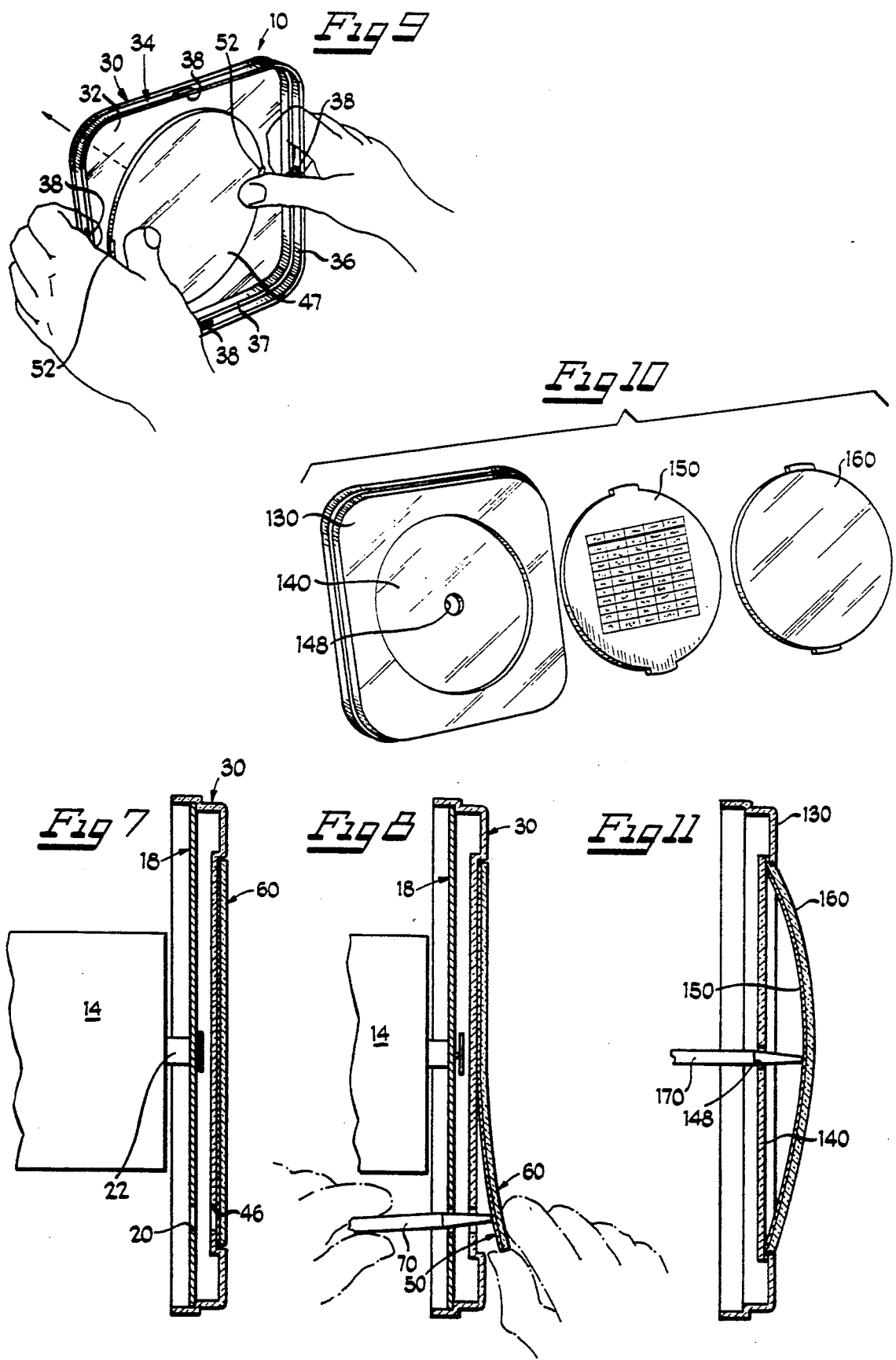

POSTAL RATE DEVICE

BACKGROUND OF THE INVENTION

The present invention relates in general to scale attachments, and, in particular, to a postal rate device for use in association with the face plate of the base of a scale for facilitating the interchangeability of an insert card, which preferably includes a postal rate conversion table thereon, while enabling such replacement to occur with little effort, and without reliance upon any special tools, and without having to replace the entire housing for the insert card.

For many years, various types of scales have utilized, in cooperation with a scale, conversion tables which are intended to provide a quick reference between the desired conversion rates, such as postal rates, and the representative weight of the load resting upon the weighing plate of the scale itself. Although many of such conversion tables have proven to be quite useful, replacement of such conversion tables have resulted in difficulties and unnecessary expenses when rates represented on the conversion tables change. As is typical with respect to the U.S. Post Office, for example, as well as privately owned carrier services, postal rates are relatively dynamic, and accordingly, the correct postal rate must be referenced at all times. As is customary with many businesses, determining the correct amount of postage to cover the cost of shipping a parcel is achieved by weighing the parcel, and then referencing the weight of the parcel with a conversion table. Such a conversion table is typically incorporated on or near the face of the scale itself or, alternatively, on a chart which has no physical attachment whatsoever to the scale.

Unfortunately, use of conversion tables which are not attached to the scale often become lost and/or worn, and are not as accessible as those actually attached to the scale itself. On the other hand, the conversion tables which are attached to the scale, can create problems with respect to ease in replacement, as well as cost of replacement when the representative conversions change. Indeed, many of such replacement methods require the removal of nuts and bolts and/or screws from the scale in order to remove the conversion table therefrom. Furthermore, the conversion table is quite often integrally formed into the face of the scale, making replacement costly. Additional problems with respect to conversion tables which are physically attached to the scale, are also prevalent from a manufacturer's point of view.

Many of the prior art devices which require replacement of conversion tables, utilize conversion tables which are dedicated to a specific size or model scale. Accordingly, many different sizes of such conversion tables must be produced. Such production not only increases tooling costs and the like, but it additionally increases inventory costs and teaches away from standardization.

It is thus an object of the present invention to provide a postal rate device which is easily attached and removed from a scale, without the necessity of bolts and nuts and/or screws for securing the device to the face plate of the scale, and accordingly can be replaced without the need of special tools to remove and replace the device.

It is further an object of the present invention to provide a postal rate device which utilizes a conversion table in cooperation with a cover and a shield, all of which are removably secured together.

It is yet another object of the present invention to provide a postal rate device that permits removal and replacement of the conversion table without having to detach the entire cover from the scale.

It is also an object of the present invention to provide a postal rate device which utilizes a conversion table which can be used in association with many different sizes of scales, so as to reduce manufacturing costs, as well as inventory costs for the conversion tables themselves.

It is still further an object of the present invention to provide a postal rate device which is relatively inexpensive to manufacture.

These and other objects of the present invention will become apparent in light of the present specification and drawings.

SUMMARY OF THE INVENTION

The present invention relates to a postal rate device for a scale having a base portion that carries a weighing plate and has a face plate. Also carried by the base portion are weight indicator means which are operatively connected with the weighing plate for representing, on the face plate, the weight of a load placed on the weighing plate.

The postal rate device includes a cover on the face plate of the base portion. The cover has a first side and a second side which is positioned opposite to the first side. The second side is positioned adjacent to the front face of the base portion. An insert card having a front face and a back face is positioned opposite to the front face. The insert card is carried by the cover with one of the faces of the insert card exposed to view. The insert card has indicia on at least the face which is exposed to view. Also included are means for assisting the cover in carrying the insert card in a predetermined position.

The preferred embodiments of the postal rate device include means to shield the face of the insert card which is exposed to view when the insert card is carried by the cover and means for securing the shield means to the cover. This shield has a front side and a back side which is opposite to the front side. The back side is adjacent to the exposed to view face of the insert card when the shield means is secured to the cover. At least a portion of the shield is non-opaque which enables visual observance of at least a portion of the insert card when the insert card is actually placed between the shield and the cover. The postal rate device also has means facilitating removal of the shield means and insert card. Means are provided for securing the shield means to the cover.

The cover itself includes a recessed portion. Both the insert card, as well as the shield means, are configured to be removably positioned within the recessed portion. Furthermore, the securing means serves to releasably secure the shield means within the recessed portion. Means are provided for facilitating removal of the shield means and the insert card from the recessed portion.

The facilitating means includes an aperture in the recessed portion with the aperture being accessible through the face plate when the cover is attached to the face plate so that an instrument may be inserted through the aperture to engage the insert card and shield means to transmit a force sufficient to overcome the shield securing means.

The face plate is provided with an opening and the aperture is alignable with the opening when the cover is attached to the face plate.

In the preferred embodiments, a wall stands between the recessed portion and one of the sides of the cover. Furthermore, the securing means comprises one or more slots in the wall, and one or more tabs on the shield means with each of the tabs being engageable in a corresponding one of the slots to secure the shield means within the recessed portion.

In these embodiments, the shield means has a predetermined thickness, and the one or more tabs each have a preselected thickness which is less than the predetermined thickness of the shield means. The preselected thickness of the tabs extend from the back side of the shield means to approximately the middle of the predetermined thickness of the shield means. Accordingly, the front side of the shield means is positioned in substantially flush relationship with the first side of the cover after the insert card has been seated in the recessed portion and the shield has been secured over the insert card.

In the preferred embodiments of the invention, the securing means comprises two symmetrically opposed ones of the slots, and two symmetrically opposed ones of the tabs. An aperture in the recessed portion facilitates removal of the shield means and insert card. The aperture is accessible through the face plate when the cover is on the face plate so that an instrument may be inserted through the aperture to engage the insert card and shield means to transmit a force sufficient to overcome the securing means. In one of the preferred embodiments the aperture is positioned approximately equidistantly between each of the slots and corresponding tabs.

The insert card includes one or more tabs for insertion into a corresponding one of the slots to assist said cover in carrying the insert card in the predetermined position in the recessed portion. Furthermore, the insert card itself, has as many tabs as there are slots.

Preferably, the front side of the shield means is positioned in substantially flush relationship with the first side of the cover after the insert card has been seated in the recessed portion, and the shield means has been secured over the insert card.

The postal rate device may include means for removably attaching the cover to the face plate. More particularly, the face plate has peripheral edges, and the attaching means themselves, comprise a plurality of clip members which are located on the second side of the cover. The clip means each attach to a portion of the peripheral edges and accordingly attach the cover to the front face as a result of an interference fit therebetween.

In the postal rate device with the removably attached cover, there are means to shield the face of the insert card which is exposed to view when the insert card is carried by the cover and means for securing the shield means to the cover. This shield has a front side and a back side which is opposite to the front side. The back side is adjacent to the exposed to view face of the insert card when the shield means is secured to the cover. At least a portion of the shield is non-opaque which enables visual observance of at least a portion of the insert card when the insert card is actually placed between the shield and the cover. Means are provided for securing the shield means to the cover. The cover itself includes a recessed portion. Both the insert card, as well as the shield means, are configured to be removably positioned within the recessed portion. Furthermore, the securing means serves to releasably secure the shield means within the recessed portion. The recessed portion has an aperture which facilitates removal of the insert card from the recessed portion after the shield means has been removed from the face plate.

The preferred embodiments of the postal rate device comprise a movable pointer and indicia, which together make up the weight indicator means. The indicia are positioned on the face plate. These indicia represents various weight increments, and the movable pointer is positionable relative to the weight increments for determining the weight of the load placed upon the weighing plate. Preferably, the indicia on the insert card corresponds with at least the weight represented by the weight indicator means.

BRIEF DESCRIPTION OF THE DRAWINGS

FIG. 1 of the drawings is an elevated perspective view of the postal rate device, showing in particular, the attachment of the device to the face plate of the scale;

FIG. 2 of the drawings is a back elevational view of the postal rate device, partially broken away, showing in particular, the attachment of the device to the face plate of the scale including some of the clips used to attach the cover to the face plate plus an opening through the face plate of the scale, and further showing the backs of the cover and its recessed portion through the broken away portion of the face plate;

FIG. 3 of the drawings is an exploded perspective view of the postal rate device, showing in particular, the positioning of the insert card between the cover and the shield, and further showing the recessed portion within the cover, plus an aperture in the recessed portion, and the tabs of the insert card and shield which engage with the slots in the cover;

FIG. 4 of the drawings is an enlarged scale, cross-sectional view of the postal rate device, taken along line 4—4 of FIG. 1, showing in particular, the clips on the inside ridge of the cover used to secure the cover to the face plate of the scale;

FIG. 5 of the drawings is an enlarged scale fragmentary exploded perspective view showing the cooperation between tabs on the insert card and shield, with one of the slots in the cover;

FIG. 6 of the drawings is an enlarged scale fragmentary cross-sectional view of the postal rate device, showing in particular, the securing means, and accordingly, the nestable cooperation of the tabs of the shield and the insert within the slot in the cover;

FIG. 7 of the drawings is an enlarged scale, fragmentary cross-sectional view of the postal rate device, taken generally along line 7—7 of FIG. 2, showing in particular, the cover attached to the face plate with the insert card in the recessed portion and the shield secured in the recessed portion, plus the alignment of the aperture in the recessed portion and the opening in the face plate;

FIG. 8 of the drawings is an enlarged scale cross-sectional view of the postal rate device, similar to FIG. 7, but showing in particular, insertion of a pencil or the like through the aligned aperture and opening to effect release of the secured shield from the attached cover to facilitate removal and replacement of the insert card while the cover remains attached to the face plate;

FIG. 9 of the drawings is a back perspective view of the postal rate device, showing in particular, the attachment clips used to attach the cover onto the face plate of the scale, as well as an alternate method of disengaging the securing means;

FIG. 10 of the drawings is an exploded perspective view of the postal rate device, showing in particular, the positioning of the insert card between the cover and the shield, and further showing the recessed portion within the cover plus an aperture, different from the one shown in FIG. 3, in the recessed portion, and the tabs of the insert card and shield which engage with the slots in the cover; and FIG. 11 of the drawings is an enlarged scale, cross-sectional view of the cover, insert card and shield of the postal rate device, showing in particular, insertion of a pencil or the like through the aperture shown in FIG. 3 of the drawings to facilitate releasing the secured shield from the cover for removal and replacement of the insert card after the cover has been detached from the face plate.

DETAILED DESCRIPTION OF THE DRAWINGS

While this invention is susceptible of embodiment in many different forms, there is shown in the drawings and will herein be described in detail, specific embodiments with the understanding that the present disclosure is to be considered as an exemplification of the principles of the invention and is not intended to limit the invention to the embodiments so illustrated.

A postal rate device 10 is shown in FIGS. 1 and 2 attached to a scale 12 having a base portion 14 that includes a base plate 15 for supporting the scale on a generally planar surface such as a counter or desk top. Base portion 14 carries a standard 16 that is movable in relation to the base portion 14 in a generally vertical orientation. Connected atop standard 16 is a weighing plate 17. Housed within base portion 14 is a standard mechanism, such as that used in prior art scales including Health 0 Meter Scale Model 3000HT.

Extending outwardly from base portion 14 is a face plate 18 having a generally rectangular peripheral edge 19. In the back of face plate 18 is an aperture 20. As is best shown in FIG. 4, face plate 18 is secured to base portion 14 by a short post 22. A shaft 23 extends through both face plate 18 and post 22 into the interior of base portion 14. Shaft 23 is operatively connected with the previously referred to conventional mechanism such that upon a piece of mail being placed atop weighing plate 17, the resulting downward movement of weighing plate 17 is transmitted through standard 16 into the mechanism affecting rotation of shaft 23. Mounted o the end of shaft 23 that extends through post 22 and face plate 18 is a pointer 24. Spaced about face plate 18 are indicia 25 representing various weight increments, which together with movable pointer 24 comprise weight indicator means.

Postal rate device 10 includes a cove 30 that is made from a non-opaque, preferably transparent, plastic material. Cover 30 has a first side 31, a second side 32 opposite first side 31, and outer edge 34 which surrounds face plate 18 of base portion 14 of scale 12, as shown in greater detail in FIG. 4. As is best shown in FIGS. 2, 4 and 9, second side 32 of cover 30 includes inner edge or lip 36, ridge 37 and four attachment clips 38. Ridge 37 is positioned on inner edge 36 of cover 30. Attachment clips 38 are all positioned proximate ridge 37 on inner edge 36, and serve to removably attach cover 30 to face plate 18 of scale 12. Between each of clips 38 and ridge 37 there is a notched portion 39 which is best illustrated in FIG. 4.

Cover 30 further includes a recessed portion 40, best shown in FIGS. 3 and 4. Recessed portion 40 is integrally formed within first side 31 of cover 30. Extending between first side 31 and recessed portion 40 is a wall 42. There are two, symmetrically opposed slots 44 in wall 42. An aperture 46 extends through recessed portion 40 from its back side 47 to its front side 48. Aperture 46 is positioned approximately equidistantly, that is offset generally ninety degrees, between each of slots 44.

Removably receivable within recessed portion 40 is an insert card 50 preferably having a substantially similar configuration, such as round—although other shapes are also contemplated. Projecting outwardly from peripheral edge 51 of insert card 50 are a pair of diametrically opposed, generally rectangular tabs 52. Each of tabs 52 is insertable into a corresponding one of slots 44 in wall 42 to assist cover 30 in carrying insert card 50 in a predetermined position within recessed portion 40. Tabs 52 on insert card 50 serve to preclude any inadvertent movement of insert card 50 after it is positioned within recessed portion 40. Insert card 50 has a front face 54 and a back face 55 opposite front face 54. On front face 54 are indicia 56 and 58 which, in the preferred embodiments, serve as a conversion table for postal rates.

Releasably securable within recessed portion 40 is a shield 60. Like insert card 50, shield 60 has a substantially similar configuration to recessed portion 40 and insert card 50, which in the preferred embodiment is round—although other shapes are also contemplated. Shield 60 has a pair of symmetrically opposed, generally rectangular tabs 62 that align with tabs 52 of insert card 50. Each of tabs 52 is engageable in a corresponding one of slots 44 in wall 42 of recessed portion 40 for releasably securing shield 60 within recessed portion 40. There is a front side 64 and a back side 65 for shield 60. At least that portion of shield 60 that overlies indicia 56, 58 on insert card 50 should be non-opaque to enable visual observance of such indicia. Preferably, shield 60, like cover 30, is made in its entirety of a transparent plastic material. When assembled, as is perhaps best illustrated in FIG. 3, back side 55 of insert card 50 is positioned adjacent recessed portion 40 with back side 65 of shield 60 being adjacent front face 54, which is the face of insert card 50 that is exposed to view.

Extending between front side 64 and back side 65 is an edge 66. The height of edge 66 is such that added with the thickness of insert card 50, the combined total is approximately equal to the height of wall 42, or the depth of recessed portion 40. Accordingly, when both insert card 50 and shield 60 are positioned within recessed portion 40, the front side of shield 60 is in a substantially flush relationship with first side 31 of cover 30.

In the preferred embodiment, each of tabs 62 have a preselected thickness less than the predetermined thickness of the non-tabbed portion of shield 60. As with tab 62 that is shown in FIG. 6, the back of each of the tabs is flush with back side 65 of the shield and each of the tabs then extends to approximately the middle of the thickness of the shield. When tabs 62 are completely engaged within slots 44, shield 60, as well as insert card 50, will be removably secured to cover 30. After shield 60 has been removably secured to cover 30, peripheral edge 66 of shield 60 will be closely spaced from, or almost in abutment with, peripheral wall 42 of recess 40 of cover 30. In addition, with the shield removably secured in recessed portion 40, front side 64 of shield 60 is positioned in substantially flush relationship with first side 31 of cover 30.

Proper positioning of cover 30, insert card 50 and shield 60 is shown in FIG. 3. As previously mentioned in greater detail, when properly inserted, tabs 52 of insert card 50, as well as tabs 62 of shield 60, fit within slots 44 in recessed area 40 of cover 30, as shown in FIG. 5. When properly inserted, front face 54 of insert card 50 (which is the side bearing indicia, such as indicia 56 and 58), will be positioned adjacent back side 65 of shield 60. Accordingly, back face 55 of insert card 50 will abut front face 48 of recessed portion 40, as shown in FIGS. 4 and 6.

Attachment of cover 30 to face plate 18 of scale 12 is shown in FIG. 4. Cover 30 is secured to face plate 18 as a result of a snap fit of edges 19 of face plate 18 when inserted into the notched portions 39 formed between ridge 37 of cover 30 and each of attachment clips 38 of cover 30. Attachment clips 38 are constructed of a relatively rigid material which is flexible under pressure. Accordingly, forcing notched portion 39 over edge 19 of face plate 18 enables attachment clips 38 to slightly spread apart so as to provide a snap fit therebetween.

Appropriate positioning and engagement between tabs 62 of shield 60, and tabs 52 of insert card 50, within slots 44 of cover 30, is shown in FIGS. 5 and 6. As can be readily be seen from the one of slots 44 shown, the slots are positioned within peripheral wall 42 of recessed portion 40 and do not extend the entire height of peripheral edge 42. Additionally, slots 44 which are generally rectangular each have an elongated dimension that is preferably only slightly longer than the elongated dimension of either of generally rectangular tabs 52 of insert card 50, and generally rectangular tabs 62 of shield 60, so as to minimize the amount of free play therebetween, and to further facilitate a relatively snug fit between cover 30 and shield 60.

Release of shield 60 along with removal of insert card 50 for replacement may be accomplished with the present invention while cover 30 is still attached to face plate 18 of the scale. Such release is facilitated by aperture 46 which is positioned to be aligned with opening 20 in face plate 18. As is best illustrated in FIGS. 7 and 8, a pencil, or other writing instrument that is readily available in the environs in which a postal scale device is most often used, may be inserted through aligned opening 20 and aperture 46, both of which are conveniently sized to receive such an instrument. Opening 20 and aperture 46 could be made large enough to accept a user's finger, however, it would then be necessary to insure that there would be no sharp edges, burrs or the like that might cut or otherwise injure the user's finger.

At least a portion of shield 60 and insert card 50 are flexed outwardly from recessed portion 40 and front force 31 of shield 30 a sufficient distance by pushing on a pencil or the like inserted through aligned opening 20 and aperture 46 to permit a user to grasp the shield and insert card to release the shield and remove the insert card. With aperture 46 positioned approximately equidistantly between the symmetrically opposed slots 44 and the corresponding ones of tabs 52 of insert card 50 and tabs 62 of shield 60, the force exerted through instrument 70 is most evenly distributed and directed to a point on shield 60 that is least secured to cover 30 by the engagement of tabs 62 in slots 44. If a sufficient amount of force is exerted in pushing instrument 70 against insert card 50 and shield 60, it will completely release the securing engagement of the respective tabs 52 and 62 from slots 44 and pop both the insert card and the shield out of the recessed portion. A replacement insert card may then be substituted for the one that has been removed and shield 60 may then be replaced in its protective position over the new insert card.

Postal rate device 10 is further shown in FIG. 9 removed from face plate 18 of scale 12. Specifically, FIG. 9 illustrates a facile method of releasing shield 60 for removal of insert card 50 from recessed portion 40 of cover 30 after cover 30 has been detached from scale 12. Such detachment can be achieved simply by pulling one side of inner edge or lip 36 of cover 30 out and away from edge 19 of face plate 18, and then pulling cover 30 away from scale 12.

After cover 30 has been removed from scale 12, a person then grips cover 30 so that both thumbs of the person's hand are pressed against the outer area of back side 47 of recessed portion 40 of cover 30, generally in the area near the engagement of each of tabs 62 of the shield in the respective slots 44 of the recessed portion 40. Pressure is then exerted by the thumbs on back side 47 of cover 30. Such pressure forces tabs 62 of shield 60 to pop out of slots 44, in the direction of the arrow. If necessary, insert card 50 can then be removed by pushing a finger or other object through aperture 46 thereby popping insert card 50 out of recessed area 40 of cover 30. After removal, a new insert card bearing an updated conversion table, can be exchanged and reinserted between cover 30 and shield 60, and thus back onto scale 12, without the necessity of any special tools.

FIGS. 10 and 11 show an alternative embodiment in which an aperture 148 is generally centrally disposed within a recessed portion 140 of a cover 130. An insert card 150 and a shield 160 are received and releasably secured within recessed portion 140 in the same way as has just been described with respect to cover 30, recessed portion 40, insert card 50 and shield 60. Once the assembled cover 130, insert card 150 and shield 160 are detached from the scale, a pencil or other writing instrument 170 may be inserted through aperture 148 and pushed to exert a force generally upon the center of insert card 150 and shield 160 to pop them out of recessed portion 140 for removal and replacement of insert card 150.

The foregoing description and drawings merely explain and illustrate the invention and the invention is not limited thereto, except insofar as the appended claims are so limited as those skilled in the art who have the disclosure before them will be able to make modifications and variations therein without departing from the scope of the invention.

What is claimed is:

1. A postal rate device for a scale having a base portion and a weighing plate carried by said base portion, with said base portion having a face plate, weight indicator means carried by said base portion and operatively connected with said weighing plate for representing on said face plate, the weight of a load placed on said weighing plate, said device comprising:
   a cover on said face plate;
   said cover having a first side and a second side opposite said first side, with said second side being positioned adjacent to said face plate;

an insert card having a front face and a back face opposite said front face, said insert card being carried by said cover with one of said faces of said insert card exposed to view, said insert card bearing indicia on at least the face exposed to view; and means for assisting said cover in carrying said insert card in a predetermined position.

2. The postal rate device according to claim 1 in which the invention further includes:

means to shield said face of said insert card exposed to view when said insert card is carried by said cover, said shield means having a front side and a back side opposite said front side, said back side being adjacent to said exposed view face of said insert card when said shield means is secured to said cover, at least a portion of said shield means being nonopaque to enable visual observance of at least a portion of said insert card when said insert card is placed between said shield means and said cover; and means for securing said shield means to said cover.

3. The postal rate device according to claim 2 further comprising means for facilitating removal of said shield means and said insert card.

4. The postal rate device according to claim 2 in which:

said cover includes a recessed portion;

said shield means is configured to be removably received within said recessed portion; and said securing means releasably secures said shield means within said recessed portion.

5. The postal rate device according to claim 4 further comprising means for facilitating removal of said shield means and said insert card from said recessed portion.

6. The invention according to claim 5 in which the facilitating means comprises:

an aperture in the recessed portion, and said aperture being accessible through said face plate when said cover is attached to said face plate such that an instrument may be inserted through said aperture to engage said insert card and said shield means to transmit a force sufficient to overcome said securing means.

7. The invention according to claim 6 in which:

said face plate has an opening, and said aperture is alignable with said opening when said cover is attached to said face plate.

8. The invention according to claim 4 in which:

a wall extends between said recessed portion and one of said sides of said cover; and said securing means comprises one or more slots in said wall and one or more tabs on said shield means with each of said tabs being engageable in a corresponding one of said slots for securing said shield means within said recessed portion.

9. The invention according to claim 8 in which:

said shield means has a predetermined thickness; and said one or more tabs each has a preselected thickness that is less than the predetermined thickness of said shield means.

10. The invention according to claim 9 in which the preselected thickness of said one or more tabs extends from said back side of said shield means to approximately the middle of the predetermined thickness of said shield means.

11. The invention according to claim 10 in which said front side of said shield means is positioned in substantially flush relationship with said first side of said cover after said insert card has been seated in said recessed portion and said shield means has been secured over said insert card.

12. The invention according to claim 8 in which said securing means comprises two symmetrically opposed ones of said slots, and two symmetrically opposed ones of said tabs.

13. The postal rate device of claim 12 further comprising:

an aperture in the recessed portion for facilitating removal of said shield means and said insert card, said aperture being accessible through said face plate when said cover is on said face plate such that an instrument may be inserted through said aperture to engage said insert card and said shield means to transmit a force sufficient to overcome said securing means, and said aperture being positioned approximately equidistantly between each of said slots and corresponding tabs.

14. The invention according to claim 8 in which said insert card includes one or more tabs for insertion into a corresponding one of said slots to assist said cover in carrying said insert card in the predetermined position within said recessed portion.

15. The invention according to claim 14 in which there are as many of said tabs on said insert card as there are of said slots in said wall.

16. The invention according to claim 4 in which said front side of said shield means is positioned in substantially flush relationship with said first side of said cover after said insert card has been seated in said recessed portion and said shield means has been secured over said insert card.

17. The postal rate device according to claim 1 in which the invention further includes means for removably attaching said cover to said face plate.

18. The invention according to claim 17 in which:

said face plate has peripheral edges;

said attaching means comprises a plurality of clip members on said second side of said cover, and said clip members each attach to a portion of said peripheral edges and attach said cover to said face plate as a result of an interference fit between said clip members and said portion of said peripheral edges.

19. The postal rate device according to claim 17 in which the invention further includes:

means to shield said face of said insert card exposed to view when said insert card is carried by said cover, said shield means having a front side and a back side opposite said front side, said back side being adjacent to said exposed view face of said insert card when said shield means is secured to said cover, at least a portion of said shield means being nonopaque to enable visual observance of at least a portion of said insert card when said insert card is placed between said shield means and said cover;

means for securing said shield means to said cover;

a recessed portion in said cover;

said shield means being configured to be removably received within said recessed portion;

said securing means releasably securing said shield means within said recessed portion; and an aperture in said recessed portion to facilitate removal of said insert card from said recessed portion after said attached cover has been removed from said face plate.

20. The invention according to claim 1 in which:
said weight indicator means comprises indicia on said face plate of said scale and a movable pointer,
said indicia on said front face representing various weight increments,
said movable pointer being positionable relative to said weight increments for determining the weight of the load placed upon said weighing plate, and
said indicia on said insert card bear a relation to at least some of the weight increments represented by said weight indicator means.

* * * * *

UNITED STATES PATENT AND TRADEMARK OFFICE
CERTIFICATE OF CORRECTION

PATENT NO. : 5,097,915
DATED : March 24, 1992
INVENTOR(S) : Joss, et al.

It is certified that error appears in the above-identified patent and that said Letters Patent is hereby corrected as shown below:

Col. 5, Line 52    Delete "Mounted o" and instead insert --Mounted on--.

Col. 5, Line 57    Delete "cove 30" and instead insert --cover 30--.

Signed and Sealed this

Twenty-ninth Day of June, 1993

Attest:

MICHAEL K. KIRK

Attesting Officer

Acting Commissioner of Patents and Trademarks